(12) United States Patent
Lichtenstein et al.

(10) Patent No.: US 12,095,776 B2
(45) Date of Patent: *Sep. 17, 2024

(54) LATERAL MOVEMENT ANALYSIS USING CERTIFICATE PRIVATE KEYS

(71) Applicant: Wiz, Inc., New York, NY (US)

(72) Inventors: Avi Tal Lichtenstein, Tel Aviv (IL); Ami Luttwak, Binyamina (IL); Yinon Costica, Tel Aviv (IL)

(73) Assignee: WIZ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,608

(22) Filed: Dec. 22, 2023

(65) Prior Publication Data

US 2024/0146743 A1 May 2, 2024

Related U.S. Application Data

(63) Continuation of application No. 18/478,472, filed on Sep. 29, 2023, now Pat. No. 11,916,926, which is a continuation of application No. 17/657,492, filed on Mar. 31, 2022, now Pat. No. 11,811,786.

(60) Provisional application No. 63/170,225, filed on Apr. 2, 2021.

(51) Int. Cl.
*H04L 9/40* (2022.01)
(52) U.S. Cl.
CPC .................................. *H04L 63/14* (2013.01)
(58) Field of Classification Search
None
See application file for complete search history.

(56) References Cited

U.S. PATENT DOCUMENTS

| | | | |
|---|---|---|---|
| 8,595,822 B2 | 11/2013 | Schrecker et al. | |
| 9,825,978 B2* | 11/2017 | Siva Kumar | H04L 63/083 |
| 10,397,185 B1* | 8/2019 | Sandholm | H04L 63/102 |
| 10,476,898 B2* | 11/2019 | Muddu | G06F 16/444 |
| 11,184,392 B2* | 11/2021 | Thomas | H04L 63/0428 |
| 11,258,590 B1* | 2/2022 | Tsarfati | H04L 9/0825 |
| 11,606,378 B1* | 3/2023 | Delpont | H04L 43/16 |
| 11,916,926 B1* | 2/2024 | Lichtenstein | |
| 2014/0059541 A1* | 2/2014 | Heninger | G06F 9/45545 718/1 |
| 2014/0075013 A1* | 3/2014 | Agrawal | G06F 11/3409 709/224 |

(Continued)

*Primary Examiner* — Kaveh Abrishamkar
(74) *Attorney, Agent, or Firm* — M&B IP Analysts, LLC (57) ABSTRACT

A system and method for detecting potential lateral movement in a cloud computing environment includes detecting a private encryption key and a certificate, each of which further include a hash value of a respective public key, wherein the certificate is stored on a first resource deployed in the cloud computing environment; generating in a security graph: a private key node, a certificate node, and a resource node connected to the certificate node, wherein the security graph is a representation of the cloud computing environment; generating a connection in the security graph between the private key node and the certificate node, in response to determining a match between the hash values of the public key of the private key and the public key of the certificate; and determining that the first resource node is potentially compromised, in response to receiving an indication that an element of the public key is compromised.

25 Claims, 6 Drawing Sheets

(56) References Cited

U.S. PATENT DOCUMENTS

| | | | |
|---|---|---|---|
| 2014/0089658 A1* | 3/2014 | Raghuram | G06F 9/45533 |
| | | | 380/278 |
| 2015/0121078 A1* | 4/2015 | Fu | H04L 9/3263 |
| | | | 713/175 |
| 2017/0026355 A1* | 1/2017 | Mathaiyan | H04L 63/0428 |
| 2019/0297112 A1* | 9/2019 | Yu | H04L 63/18 |
| 2020/0267552 A1* | 8/2020 | Lee | H04W 12/068 |
| 2021/0051137 A1* | 2/2021 | Ruiz | H04L 9/0894 |
| 2021/0120026 A1* | 4/2021 | Kondaveeti | H04L 63/0272 |
| 2022/0272117 A1 | 8/2022 | Maheve et al. | |
| 2022/0345483 A1* | 10/2022 | Shua | H04L 9/0825 |
| 2023/0011957 A1* | 1/2023 | Panse | H04L 63/1416 |
| 2023/0164164 A1* | 5/2023 | Herzberg | H04L 63/20 |
| | | | 726/1 |

* cited by examiner

LATERAL MOVEMENT ANALYSIS USING CERTIFICATE PRIVATE KEYS

CROSS-REFERENCE TO RELATED APPLICATIONS

This application is a continuation of U.S. Non-Provisional application Ser. No. 18/478,472, filed Sep. 29, 2023, which is a continuation of U.S. Non-Provisional application Ser. No. 17/657,492, filed Mar. 31, 2022, which claims the benefit of U.S. Provisional Application No. 63/170,225 filed on Apr. 2, 2021, all contents of which are hereby incorporated by reference.

TECHNICAL FIELD

The present disclosure relates generally to cybersecurity and, in particular, to techniques for agentless vulnerability scanning.

BACKGROUND

As users migrate data storage, processing, and management tasks to decentralized, off-location devices, platforms, and services, the limitations of such devices, platforms, and services, also referred to as cloud environments, platforms, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous, complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes are more complex to deploy and maintain for scanning of containers, such as containers managed using Kubernetes®, and others, like, container-management platforms, and may fail to provide for coverage of serverless applications. Where such agent-implementation processes fail to provide for full cloud workload vulnerability scanning, additional methods, such as snapshot-based scanning, may supplement implemented solutions.

Cloud environments are susceptible to attacks such as lateral movement, in which an attacker attempts to gain access to a resource within the cloud environment, and move through that resource to a next resource in the network. For example, an attacker may gain access through an endpoint of a cloud environment using a malware attack, then gain access to user credentials which allow the attacker to access the cloud environment, and possibly employ privilege escalation and other attacks. Once initiated, lateral movement is difficult to detect, and the more credentials an attacker is able to discover and possess, the more opportunities the attacker has to infiltrate the cloud environment and achieve their goals.

Detection of lateral movement is therefore desirable, as is prevention of such attacks. It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting potential lateral movement in a cloud computing environment. The method comprises: detecting a private encryption key and a certificate, each of the private encryption key and the certificate further including a hash value of a respective public key, wherein the certificate is stored on a first resource deployed in the cloud computing environment; generating in a security graph: a private key node representing the private encryption key, a certificate node representing the certificate, and a resource node representing the first resource and connected to the certificate node, wherein the security graph is a representation of objects deployed in the cloud computing environment; generating a connection in the security graph between the private key node and the certificate node, in response to determining a match between the hash value of the public key of the private key and the hash value of public key of the certificate; and determining that the first resource node is potentially compromised, in response to receiving an indication that an element of the public key is compromised.

Certain embodiments disclosed herein also include a non-transitory computer readable medium having stored thereon causing a processing circuitry to execute a process, the process comprising: detecting a private encryption key and a certificate, each of the private encryption key and the certificate further including a hash value of a respective public key, wherein the certificate is stored on a first resource deployed in the cloud computing environment; generating in a security graph: a private key node representing the private encryption key, a certificate node representing the certificate, and a resource node representing the first resource and connected to the certificate node, wherein the security graph is a representation of objects deployed in the cloud computing environment; generating a connection in the security graph between the private key node and the certificate node, in response to determining a match between the hash value of the public key of the private key and the hash value of public key of the certificate; and determining that the first resource node is potentially compromised, in response to receiving an indication that an element of the public key is compromised.

Certain embodiments disclosed herein also include a system for detecting potential lateral movement in a cloud computing environment. The system comprises: a processing circuitry; and a memory, the memory containing instructions that, when executed by the processing circuitry, configure the system to: detect a private encryption key and a certificate, each of the private encryption key and the certificate further including a hash value of a respective public key, wherein the certificate is stored on a first resource deployed in the cloud computing environment; generate in a security graph: a private key node representing the private encryption key, a certificate node representing the certificate, and a resource node representing the first resource and connected to the certificate node, wherein the security graph is a representation of objects deployed in the cloud computing environment; generate a connection in the security graph between the private key node and the certificate node, in response to determining a match between the hash value of the public key of the private key and the hash value of public key of the certificate; and determine that the first resource node is potentially compromised, in response to receiving an indication that an element of the public key is compromised.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting potential lateral movement in a cloud computing environment. The method includes detecting a private encryption key and a certificate, each of which further include a hash value of a respective public key, wherein the certificate is stored on a first resource deployed in the cloud computing environment; generating in a security graph: a private key node, a certificate node, and a resource node connected to the certificate node, wherein the security graph is a representation of the cloud computing environment; generating a connection in the security graph between the private key node and the certificate node, in response to determining a match between the hash values of the public key of the private key and the public key of the certificate; and determining that the first resource node is potentially compromised, in response to receiving an indication that an element of the public key is compromised.

Workloads such as virtual machines and containers are scanned for private keys, which are then matched to certificates. The certificates may be matched to other workloads. Properties of the certificates are extracted and loaded into a security graph, stored on a graph database. The properties may be, for example, a subject, an issuer of the certificate, an expiration date of the certificate, an intended use, a policy associated with the certificate, and the like. A security graph stored in the graph database may be queried to detect risk events based at least on the properties.

Figure 1:
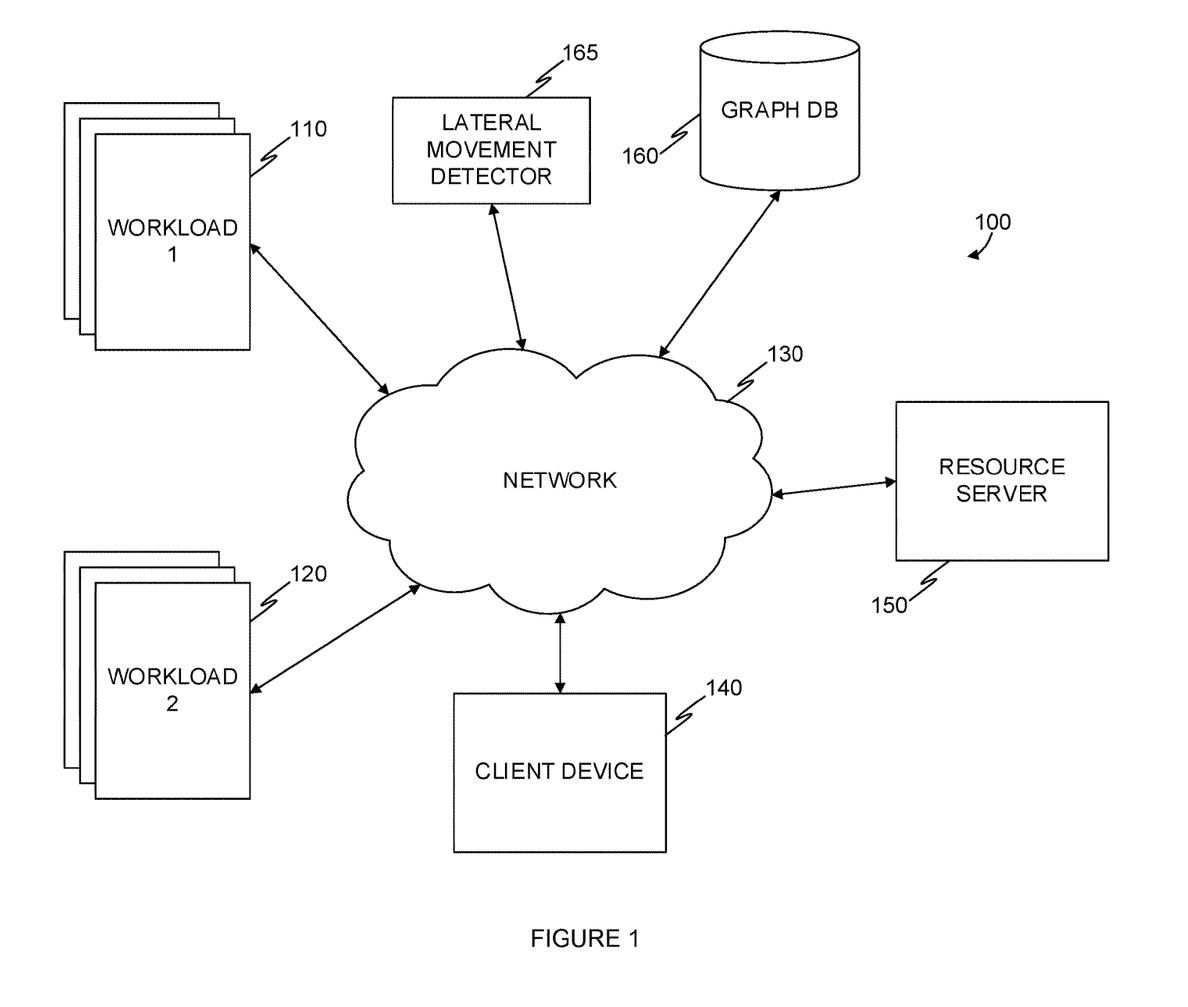
FIG. 1 is a schematic illustration for a cloud computing environment, implemented in accordance with an embodiment.

FIG. 1 is an example of a schematic illustration of a cloud computing environment 100 utilized to describe the various embodiments. The cloud computing environment 100 includes a network 130. In an embodiment, the network 130 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The cloud computing environment 100 may be implemented, for example, as a virtual private cloud (VPC). In an embodiment, the cloud computing environment 100 is deployed on a cloud infrastructure. A cloud infrastructure may be, for example, Amazon® Web Services (AWS), Google® Cloud Platform (GCP), Microsoft® Azure, and the like.

The network 130 provides connectivity for multiple workload types, such as a plurality of first workloads 110, and a plurality of second workloads 120. A workload 120 may be, for example, a specific application, service, web server, container, virtual machine, serverless function, and the like. A virtual machine may be implemented, for example, as an Oracle® VirtualBox. A container may be implemented using a container engine, such as Docker® or Kubernetes®. A serverless function may be, for example, Amazon® Lambda. The network 130 may also provide connectivity for a client device 140 and a resource server 150. The client device and/or the resource server 150 may be implemented as machines which are part of the cloud-based computing environment, or as external devices to the cloud-based computing environment. In an embodiment, a client device 140 which is external to the cloud environment may request access to a service provided by a workload of the first plurality of workloads.

In some embodiments, the first plurality of workloads 110 may be workloads of a first type (e.g., virtual machines (VM)) while the second plurality of workloads 120 may be workloads of a second type (e.g., containers). An attacker may gain access to a workload of a second type from a workload of a first type, for example, by finding certificates, credentials, passwords, and the like, which can be exploited to gain access to a workload of a first type. For example, if a container is allowed to communicate with a VM, an attacker may use credentials stored in, or accessible by, the container, to attack the VM.

Workloads, client device(s), and server(s) may communicate between themselves using encrypted communication, for example by using an implementation of Transport Layer Security (TLS) protocol. In such a protocol a client obtains a digitally signed certificate from a server. The server employs a key exchange to generate proof that the server contains the private key corresponding to the public key. The key exchange results in a unique encryption key that is used to encrypt communication between the client and the server for the duration of the session.

In certain embodiments, a workload (e.g., server) may include a certificate, also known as a public key certificate or digital certificate. The certificate is an electronic document which includes a public key, information corresponding to the public key, information about the identity of the certificate owner (also known as a subject), all of which is digitally signed by an issuer which is trusted by all parties (e.g., the client and the server). One common format for digital certificates is X.509. An issuer may be a certificate authority (CA). For example, IdenTrust® is a public key certificate authority, which provides CA related services.

The cloud computing environment 100 further includes a lateral movement detector 165, and a graph database 160, on which a security graph is stored. In certain embodiments, the lateral movement detector 165 and the graph database 160 are implemented in an inspecting cloud environment, which is different from the cloud computing environment 100. For example, the inspecting cloud environment may be deployed as a first VPC using a first cloud infrastructure, while the cloud computing environment 100 may be deployed as a second VPC on a second cloud infrastructure, which is different from the first cloud infrastructure.

In an embodiment, the graph database 160 may be configured to provide one or more functionalities including, without limitation, storing data received from various inspector workloads and data layers such as, for example, identity data, network data, image inspection data, code data, and the like, to create one or more interconnected graphs representing a cloud environment, such as the cloud computing environment 100. The graph database 160 may be configured to store only environment metadata. Environment metadata may be based on workloads, user accounts, service accounts, and the like. The graph database 160 may be further configured to not store sensitive data. In certain embodiments the security graph is generated based on a predefined data template (i.e., data schema). For example, resources may have a first data type in the data schema, while principals have another data type, which is different from the first data type. A resource may be, for example, a virtual machine, a container, a serverless function, and application, and the like. A principal is a cloud entity that acts on a resource. In an embodiment, a principal may be, for example, a user account, a service account, a role, and the like. The security graph stored in the graph database 160 is discussed in more detail below.

The lateral movement detector 165 is configured to detect private keys, for example, stored on workloads such as the plurality of first workloads 110, and detect certificates, for example, stored on a resource server 150. The lateral movement detector 165 may inspect, or cause inspection of, a workload, in order to detect private keys, certificates, and any combination thereof. In an embodiment, the lateral movement detector 165 is configured to query the security graph stored on the graph database 160.

Figure 2:
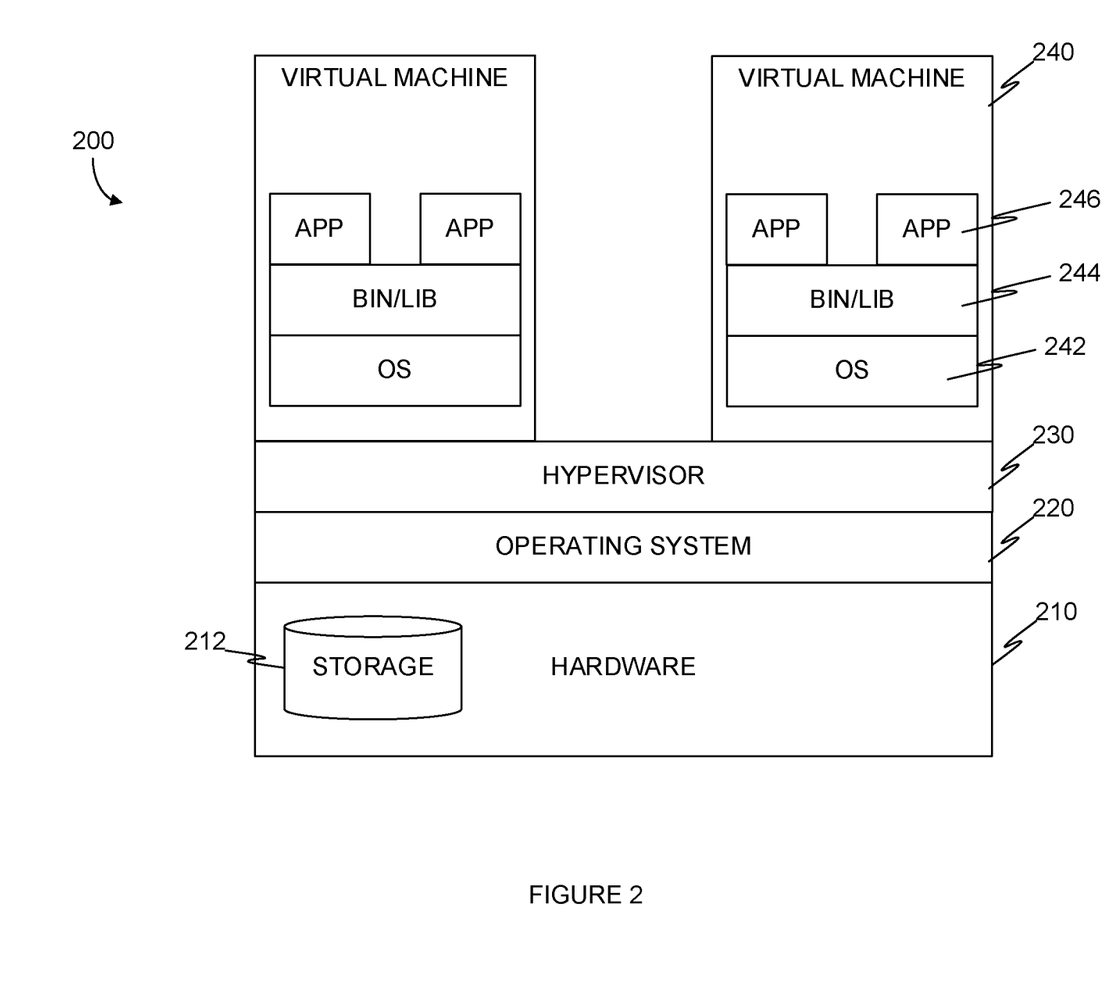
FIG. 2 is a schematic illustration for a virtual machine, implemented in accordance with an embodiment.

FIG. 2 is an example of a schematic illustration 200 for a virtual machine, utilized to describe the various embodiments. A virtual environment requires a hardware layer 210, which includes physical devices such as storage devices, memory devices, processors, network interface cards, and the like. Storage device 212 is an example of such a physical device.

An operating system (OS) 220 runs on top of the hardware layer 210. An OS may be, for example, Linux®, Microsoft Windows®, and the like. The OS layer supports a hypervisor application 230. A hypervisor may be, for example, an Oracle® VirtualBox. The hypervisor application 230 may run a plurality of virtual machines, such as virtual machine 240. The hypervisor application 230 may provision hardware resources from the hardware layer 210.

A virtual machine 240 includes a guest OS 242, on top of which binaries and libraries 244 are loaded. Applications, such as application 246, are programmed to run in the virtual machine environment. In an embodiment, binaries are compiled applications which may be executed on the guest OS 242. In some embodiments, libraries include software resources used by applications, such as configuration data, prewritten code, predefined subroutines, classes, objects, and the like.

Virtual machines and containers are examples of virtual instances (i.e., workloads) which run in cloud computing environments. One benefit they provide is the ability to provision physical resources in a way which allows multiple different environments to utilize the same hardware resources.

Figure 3:
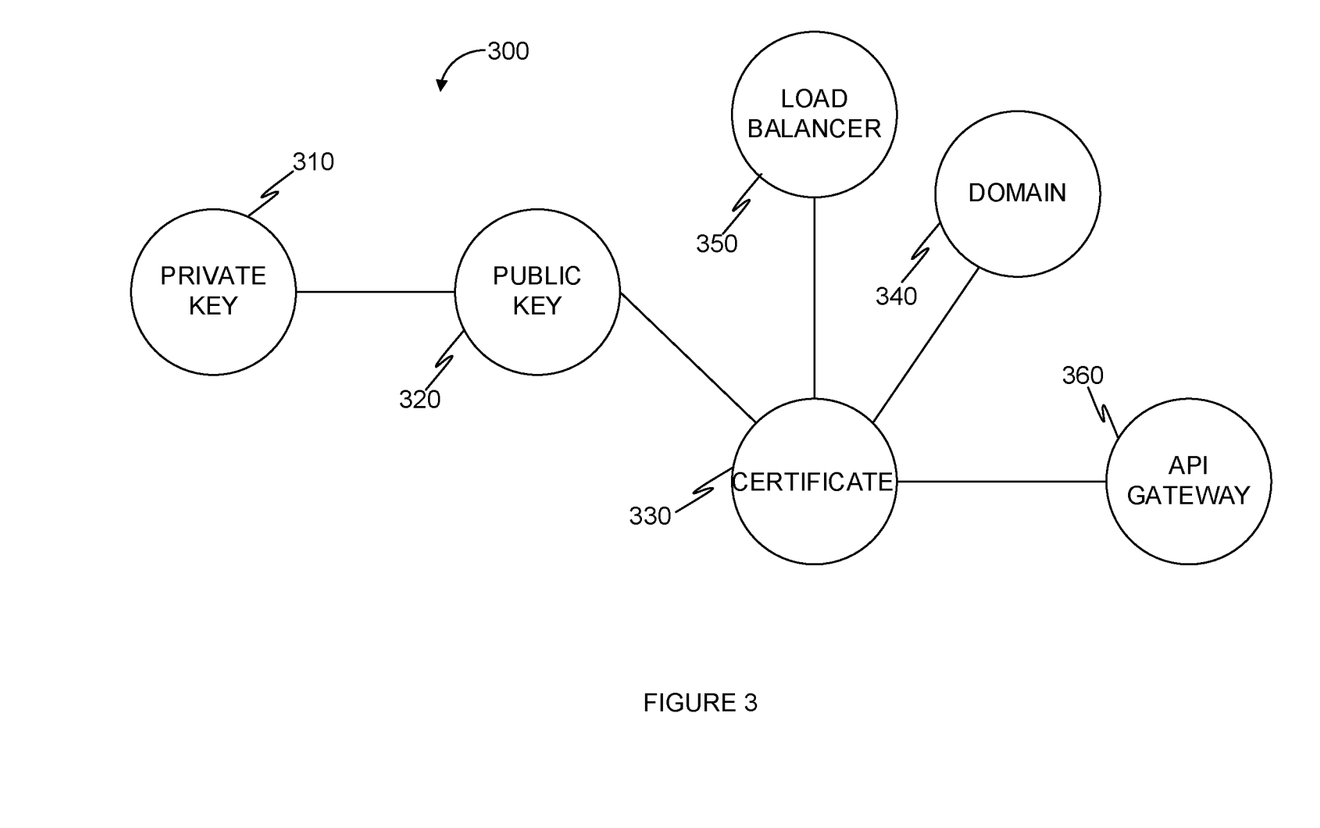
FIG. 3 is a security graph for risk assessment of objects in a cloud computing environment, implemented in accordance with an embodiment.

FIG. 3 is an example of a security graph 300 for risk assessment of objects in a cloud computing environment, implemented in accordance with an embodiment. The security graph 300, which may be stored in a graph database, such as graph database 160 of FIG. 1, includes a plurality of nodes. In an embodiment, a cloud environment may be represented in the security graph 300 in which, for example, resources, principals, and the like may be represented by nodes in the graph. The various nodes may be connected with edges. In certain embodiments, an edge may indicate a type of connection between two nodes. For example, an edge of a first type may indicate that a resource represented by a first node may be accessed by a principal represented by a second node. A security graph may further include nodes which represent applications, enrichments, endpoints, vulnerabilities, and the like.

The security graph 300 includes a private key node 310 (corresponding to a private key), which is connected via an edge to a public key node 320 (corresponding to a public key). The public key node 320 is connected to a certificate node 330, which corresponds to a digital certificate in the cloud computing environment. In an embodiment, the certificate node 330 corresponds to a file installed on a server (or other workload) in a cloud computing environment.

The certificate node 330 may be connected to server nodes, metadata nodes, and one or more public key nodes. A server node may be a workload, for example a load balancer node 350, which corresponds to a load balancer in the cloud computing environment, or an API gateway node 360, which represents an API gateway in the cloud computing environment.

A metadata node may be, for example, a domain node 340, which corresponds to a domain in the cloud computing environment. A domain node 340 may be connected to a plurality of certificate nodes. A plurality of certificates is also known as a certificate bundle. This indicates that the domain name is connected with the certificate bundle. Such a connection may be made, for example, by reading a certificate, detecting a domain name therein, generating a node representing the certificate, generating a node representing the domain, and connecting the generated nodes with an edge.

By generating a security graph including such nodes and populating it with data based on the cloud computing environment (i.e., representing the cloud computing environment in the security graph) it is possible to assess security risks. For example, if a certificate expires, or is otherwise compromised, it is readily apparent what elements of the cloud computing environment would be affected as a result. The security graph 300 may be queried to determine what resource nodes are connected to a node representing an expired certificate. In an embodiment execution of the query results in a list of resources, such as a load balancer and API gateway, which are affected by the expired certificate.

As another example, the security graph 300 may be traversed to detect workloads hosting private keys for valid domain-wide certificates, which allow wide access. Providing such access is not always desirable, therefore it is advantageous to discover such instances, which may be characterized as security risks. In an embodiment, traversing the security graph may include generating a query to detect a node representing a workload, which is connected to at least another node representing a private key for valid domain-wide certificates, wherein the connection indicates that the workload hosts the private key.

In an embodiment, each node in the security graph 300 may further store metadata and data, for example, relating to a cloud entity which the node represents. For example, a private key node 320 may include therein as metadata a hash, and algorithm type.

Figure 4:
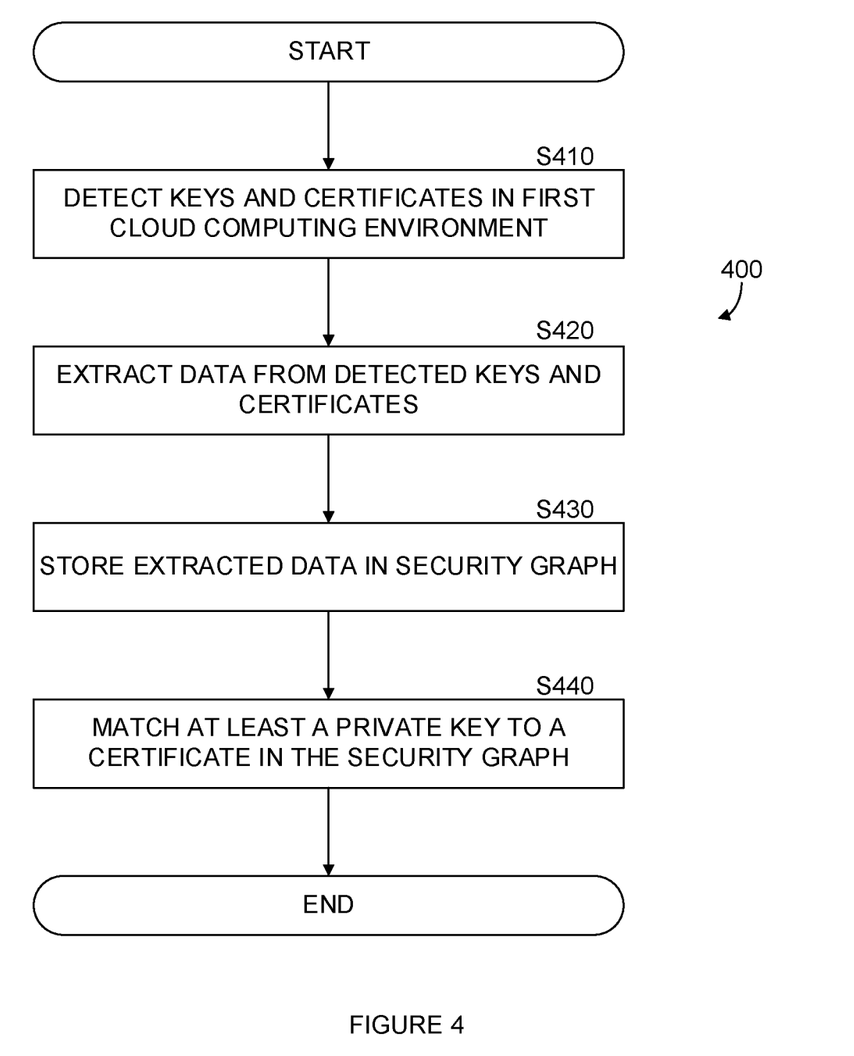
FIG. 4 is a flowchart of a method for populating a security graph for detecting lateral movement using certificate private keys, implemented in accordance with an embodiment.

FIG. 4 is an example of a flowchart 400 of a method for populating a security graph for detecting lateral movement using certificate private keys, implemented in accordance with an embodiment. Lateral movement in a cloud computing environment refers to a type of attack whereby an attacker can access a resource in the cloud computing environment, and from that resource gain access to other resources. For example, an attacker may access a VM, which has stored on it keys which allow the attacker to then access other workloads, services, and the like, using the keys to impersonate an authorized user or service account. This type of attack is often difficult to detect, as it is difficult to immediately discern real access by an authorized user, to unauthorized access of an attacker using the authorized user's credentials.

At S410, keys and certificates of a first cloud computing environment are detected. In an embodiment, keys and certificates may be detected on a workload in a first cloud computing environment, for example by inspecting the workload. A workload may be, for example, a virtual machine (VM), a container, a serverless function, and the like. In an embodiment, inspecting a workload may include generating a snapshot of a disk associated with the workload (e.g., a disk implemented on storage space provisioned from the storage 212 of FIG. 2). A volume is generated in an inspection cloud environment, and the snapshot is mounted thereon. An inspector workload, configured to detect keys, certificates, and the like, is connected to the generated volume and inspects the volume.

Throughout this disclosure reference is made to certificates and private keys as an example, though it can be readily understood the teachings herein equally apply to other asymmetrical cryptography implementations. A key may be a public key or a private key. In an embodiment, a deep content inspection of a disk image may be implemented. Certain embodiments include inspecting for multiple formats, based on different implementations of encryption standards, such as X.509, Public Key Cryptography Standards (PKCS) (e.g., #8, #12), and the like.

In certain embodiments, a first workload may host at least a key, and a second workload may host at least a certificate. In some embodiments, a workload may host both at least a key and at least a certificate.

At S420, data is extracted from the detected keys and certificates. Extracted data may include metadata, such as a particular cryptography algorithm used, version number, bit length, public key hash, etc. In an embodiment, a hash of the public key is used to link private and public keys, each of which may be detected on different workloads. A public key hash may be used to link (i.e., connect via an edge) a node representing a private key to a node representing a certificate, wherein the certificate is used to authenticate the private key.

Extracted data from a certificate may include a public key hash, subject, alternate subjects, expiration date, issue date, wildcards, and issuer information. Issuer information may pertain to a certificate authority (CA), for example. In certain embodiments, a lateral movement detector, such as described above in FIG. 1, may initiate data extraction. In other embodiments, a lateral movement detector may receive keys and certificates from an inspector workload and perform extraction of data from the keys and certificates.

At S430, the extracted data is stored in a security graph. In an embodiment, the extracted data is stored in a security graph 300 of FIG. 3, which in turn may be stored in the graph database 160 of FIG. 1. In certain embodiments, storing data in the security graph may include configuring the security graph to generate nodes for detected private keys, and detected public keys.

At S440, at least a private key is matched to a certificate. In certain embodiments, the security graph may be queried, for example by a lateral movement detector, to detect a first node representing a private key, and a second node representing a certificate, which are connected by a node representing a public key. As the hash for the public key is the same for the private key and the certificate, the respective nodes will be connected in the graph. In the example of FIG. 3 above, the hash of the public key is found together with the private key of a workload and also found on a certificate of another workload, which allows the security graph to generate an edge between the private key node 310 and the public key node 320, and generate another edge between the public key node 320 and the certificate node 330. In certain embodiments, the security graph can store an edge connecting the private key node to the certificate node.

In some embodiments, the cloud computing environment further includes a backend which may be configured to access, from cloud accounts, cloud metadata on a cloud account, including, without limitation, network configurations, IAM configurations, asset inventories, and the like, as well as any combination thereof. Such reading may be limited to control-plane configuration data with no sensitive data accessed or transmitted. Further, the platform backend may be configured to receive metadata and security findings from the account of the client cloud, where such metadata and security findings may include, as examples and without limitation, findings, such as packages and versions, misconfigurations, and the like. Data read in this manner may be further used to populate the security graph, allowing a connection (i.e., edge generation) to be made between nodes representing resources of the cloud environment (load balancers, API gateways, etc.) to nodes representing certificates and keys.

By matching certificates to public keys and private keys, and further connecting the certificates to resources which use them, it is possible to determine what type of lateral movement is possible in a mapped cloud environment, where the cloud environment is represented (i.e., mapped) in a security graph. In the example of FIG. 3 above, if an attacker gains access to the API gateway 360, which stores the certificate 330, then the load balancer 350 may be compromised as well since they use the same certificate. Alternatively, if the private key 310 is exposed, then it is possible to determine what resources are at risk of attack, for example, by querying the security graph 300.

Figure 5:
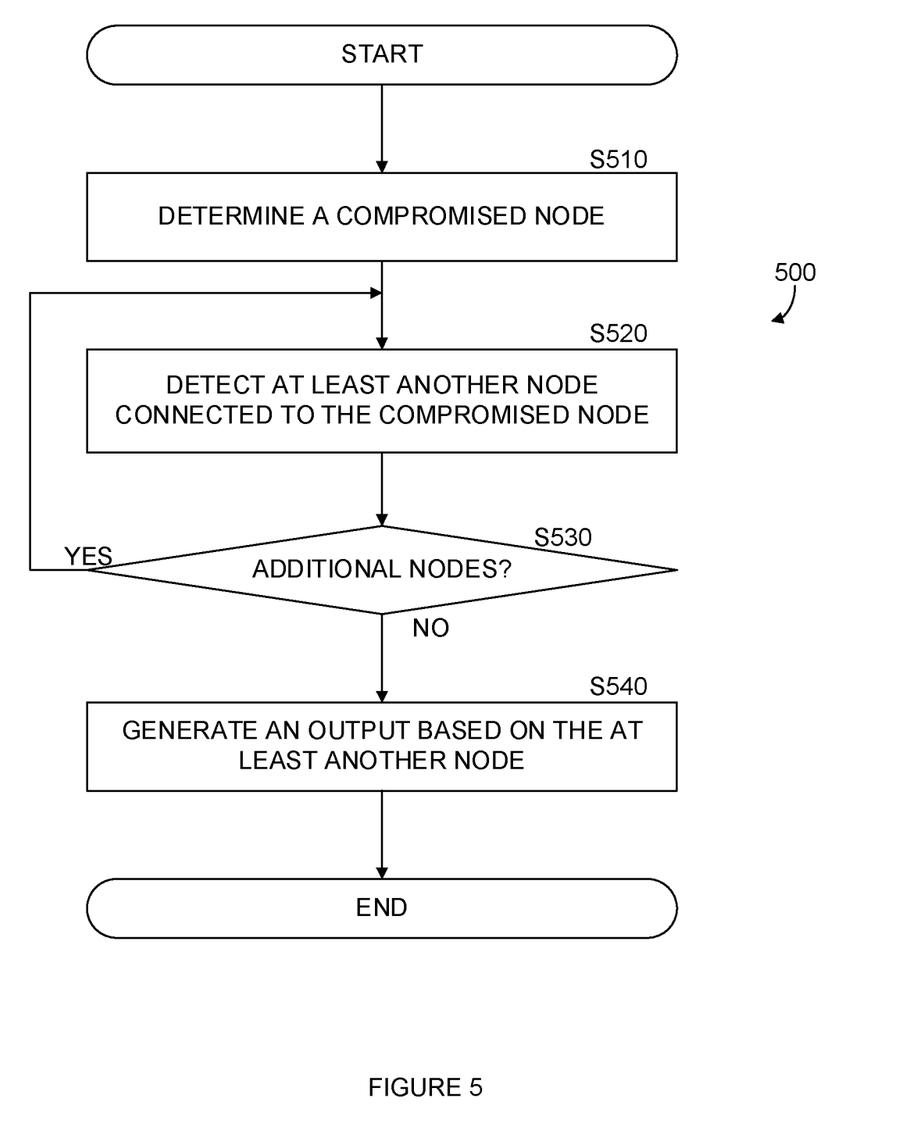
FIG. 5 is a flowchart of a method for determining certificate risk assessment using a security graph, implemented in accordance with an embodiment.

FIG. 5 is an example flowchart 500 of a method for determining certificate risk assessment using a security graph, implemented in accordance with an embodiment.

At S510, a compromised node is determined. A compromised node may be, for example, a certificate node having wildcards, a certificate node which has expired, a certificate node which will expire in a defined amount of time, where the defined amount of time is under a predetermined threshold, for example, a certificate which is set to expire in 48 hours. In some embodiments, an input may be received to indicate that a certain node is compromised. In certain embodiments, a compromised node may be indicated as such in the security graph, for example, by updating a tag, indicator, and the like, which is associated with a node. In an embodiment, a compromised node is a node to which unauthorized access has occurred, or may occur. For example, a simulation may be generated to determine what consequences would occur if a certain node were compromised. The compromised node is a node from the security graph, which is populated, for example, utilizing the method described above. In such an embodiment, a node may be marked as compromised in simulation, as opposed to actually compromised.

In certain embodiments, nodes can be marked compromised by matching data from external databases. For example, data breaches often include database dumps containing information about leaked accounts, including usernames, email addresses, passwords, hashes, and the like. A security graph may be queried with external database data to determine if user accounts, service accounts, and the like are included in such leaked accounts, and if so, mark their respective nodes as compromised, or, in other embodiments, as potentially compromised.

At S520, at least one node is detected which is connected via an edge to the compromised node. In an embodiment, a security graph is queried to detect the at least a node. In certain embodiments, two nodes may be connected directly by an edge, or indirectly with an intermediate node (or a plurality of intermediate nodes). For example, in FIG. 3 above, the certificate node 330 is connected to a load balancer node 350 and an API gateway node 360. Therefore, if the certificate node 330 is compromised those resources will be affected.

At S530, a check is performed to determine if the at least a node should be assumed as compromised. In embodiment, where a plurality of nodes are detected, a check may be performed for each such node to determine if the node should be assumed as compromised. If the at least a node is assumed to be compromised, execution may continue at S520. If 'no', execution continues at S540. In certain embodiments, additional compromised nodes are determined based on the detection. For example, if the certificate node 330 is indicated as compromised, then load balancer node 350 and API gateway node 360 may be determined as compromised. In such embodiments, execution may continue at S520, whereby the lateral movement detector assumes that the at least a node is a compromised node. In such embodiments, lateral movement detection may continue iteratively to determine what is the farthest an attacker can get from a first compromised node. Such a determination is useful as it allows to map vulnerable security points in a cloud computing environment.

At S540, an output is generated based on the detected at least one node. In an embodiment, the output includes a result generated as a response to a query executed on the security graph. In certain embodiments, a lateral movement path may be generated, to show how an attacker may compromise a first resource, and from there what other resources the attacker is able to gain access to, and using what secrets (i.e., certificates, private keys, public keys, etc.).

In an embodiment, a client device, such as client device 140 may query the graph database to determine an impact of a compromised node. In certain embodiments, a service may receive an indication that a node is compromised, then scan the risk assessment graph to determine other potentially compromised nodes. Services corresponding to potentially compromised nodes may be suspended (temporarily or permanently) from the cloud-based computing environment.

In some embodiments, a system, such as a client device, server, or lateral movement detector, may continuously query the security graph to determine a potentially compromised node. For example, the lateral movement detector may run 'what-if' scenarios by assuming a node of the security graph is compromised, then determining what other nodes may become compromised as a result. In certain embodiments, nodes which when compromised may cause a plurality of nodes to become compromised are flagged, for example, by generating a notification identifying such nodes, or adding a metadata flag to the potentially compromising node itself. A threshold may be set, so that nodes which may potentially compromise a number of nodes meeting or exceeding that threshold are flagged. Identifying such nodes may allow an administrator of the cloud computing environment to either ensure that proper strong encryption is in place in communication of such nodes, or alternatively to design a robust network to decrease the effect of the identified node in case of compromise. For example, permissions may be split between two or more accounts for client nodes in order to decrease the access that each account has.

In certain embodiments, the lateral movement detector may query the graph to determine what resource nodes are connected to certificate nodes having wildcards. Wildcard access has a high potential for abuse and attack, as this type of access is considered relatively wide. It is therefore advantageous to know what resources provide such access, in order to easily determine if such access should indeed be granted. This need is especially compounded in large cloud environments having a large number of workloads which are continuously spun up and down. Having access to such knowledge allows for better management of security policies.

The ability to take such action and quickly determine compromised workloads is beneficial as it improves overall security of a cloud computing environment. By minimizing the amount of time an unauthorized party has access to a workload, the potential for damage is also reduced.

Figure 6:
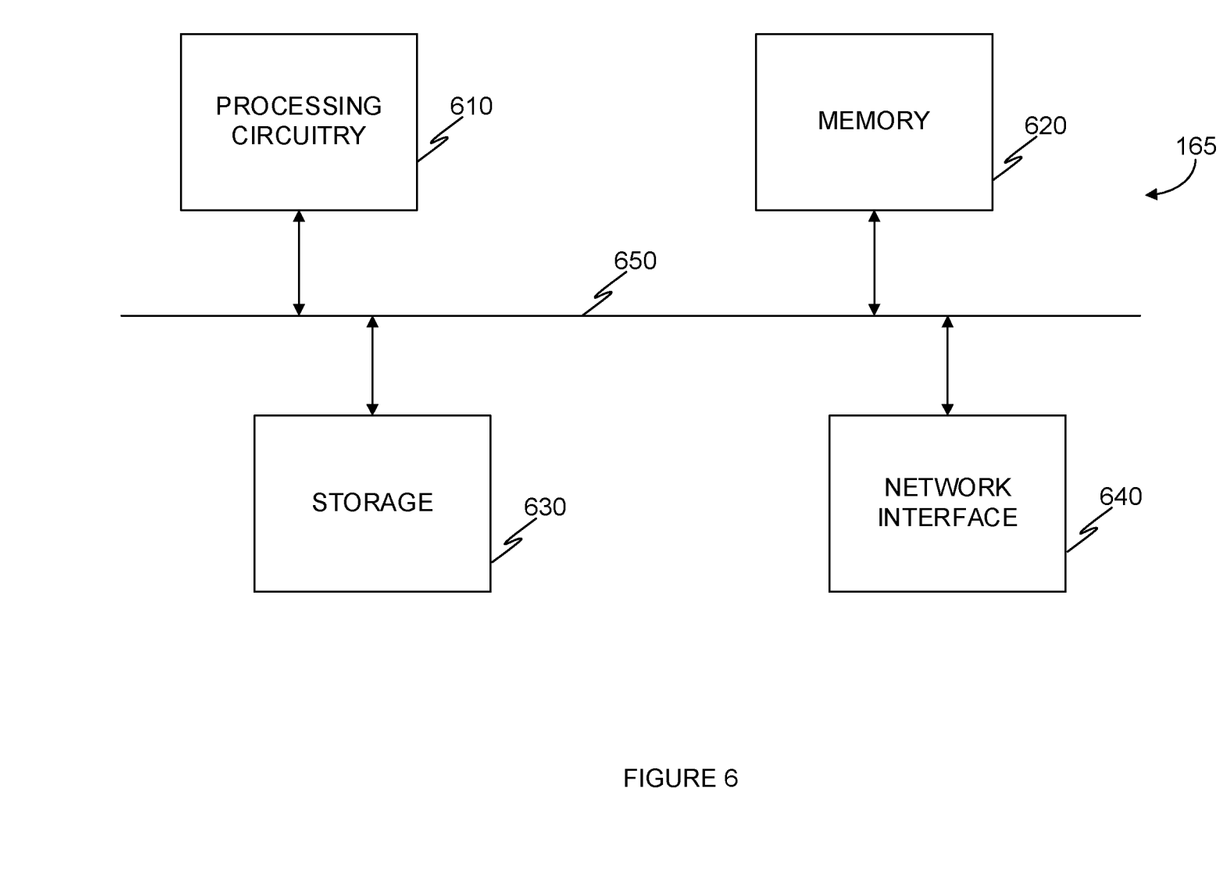
FIG. 6 is a schematic diagram of a lateral movement detector according to an embodiment.

FIG. 6 is an example schematic diagram 600 of the lateral movement detector 165 according to an embodiment. The lateral movement detector 165 includes a processing circuitry 610 coupled to a memory 620, a storage 630, and a network interface 640. In an embodiment, the components of the lateral movement detector 165 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the lateral movement detector 165 to communicate with, for example, the graph database 160.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown or not. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting potential lateral movement in a cloud computing environment, comprising:
   detecting a private encryption key including a first hash value of a first public key;
   detecting a certificate including a second hash value of a second public key, the detected certificate associated with a workload in the cloud computing environment;
   generating in a security database: a representation of the private encryption key, a representation of the certificate, and a representation of the workload, wherein the representation of the workload is associated to the representation of the certificate;
   associating the representation of the private key and the representation of the certificate, in response to determining a match between the first hash value and the second hash value; and
   determining that the workload is potentially compromised, in response to receiving an indication that an element of: the first public key, the second public key, or a combination thereof, is compromised.

2. The method of claim 1, further comprising:
   inspecting the workload to detect the certificate.

3. The method of claim 1, wherein the element of the public key is the private key.

4. The method of claim 1, wherein the element of the public key is the certificate.

5. The method of claim 1, further comprising:
   detecting a representation of a second workload in the security database which is connected to the representation of the certificate; and
   determining that the second workload is a potentially compromised workload in response to detecting the connection between the representation of the certificate and the representation of the second workload.

6. The method of claim 5, further comprising:
   generating a lateral movement path, the lateral movement path including an identifier of the workload and an identifier of the second workload.

7. The method of claim 1, further comprising:
   determining that a certificate expiration date of the certificate has lapsed.

8. The method of claim 1, further comprising:
   determining that a certificate expiration date will lapse within a predefined time.

9. The method of claim 1, further comprising:
   inspecting the workload for a cybersecurity risk.

10. The method of claim 1, further comprising:
generating a lateral movement simulation in response to indicating that the workload is simulated as compromised.

11. The method of claim 10, further comprising:
tagging the workload with a compromised simulation indicator.

12. The method of claim 1, further comprising:
querying the security database to detect a representation of a second resource in the cloud computing environment, wherein the representation of the second resource is associated with a representation of a second private key, and further associated with a representation of a certificate having a wildcard.

13. A non-transitory computer-readable medium storing a set of instructions for detecting potential lateral movement in a cloud computing environment, the set of instructions comprising:
one or more instructions that, when executed by one or more processors of a device, cause the device to:
detect a private encryption key including a first hash value of a first public key;
detect a certificate including a second hash value of a second public key, the detected certificate associated with a workload in the cloud computing environment;
generate in a security database: a representation of the private encryption key, a representation of the certificate, and a representation of the workload, wherein the representation of the workload is associated to the representation of the certificate;
associate the representation of the private key and the representation of the certificate, in response to determining a match between the first hash value and the second hash value; and
determine that the workload is potentially compromised, in response to receiving an indication that an element of: the first public key, the second public key, or a combination thereof, is compromised.

14. A system for detecting potential lateral movement in a cloud computing environment comprising:
a processing circuitry;
a memory, the memory containing instructions that, when executed by the processing circuitry, configure the system to:
detect a private encryption key including a first hash value of a first public key;
detect a certificate including a second hash value of a second public key, the detected certificate associated with a workload in the cloud computing environment;
generate in a security database: a representation of the private encryption key, a representation of the certificate, and a representation of the workload, wherein the representation of the workload is associated to the representation of the certificate;
associate the representation of the private key and the representation of the certificate, in response to determining a match between the first hash value and the second hash value; and
determine that the workload is potentially compromised, in response to receiving an indication that an element of: the first public key, the second public key, or a combination thereof, is compromised.

15. The system of claim 14, wherein the memory contains further instructions which when executed by the processing circuitry further configure the system to:
inspect the workload to detect the certificate.

16. The system of claim 14, wherein the element of the public key is the private key.

17. The system of claim 14, wherein the element of the public key is the certificate.

18. The system of claim 14, wherein the memory contains further instructions which when executed by the processing circuitry further configure the system to:
detect a representation of a second workload in the security database which is connected to the representation of the certificate; and
determine that the second workload is a potentially compromised workload in response to detecting the connection between the representation of the certificate and the representation of the second workload.

19. The system of claim 18, wherein the memory contains further instructions which when executed by the processing circuitry further configure the system to:
generate a lateral movement path, the lateral movement path including an identifier of the workload and an identifier of the second workload.

20. The system of claim 14, wherein the memory contains further instructions which when executed by the processing circuitry further configure the system to:
determine that a certificate expiration date of the certificate has lapsed.

21. The system of claim 14, wherein the memory contains further instructions which when executed by the processing circuitry further configure the system to:
determine that a certificate expiration date will lapse within a predefined time.

22. The system of claim 14, wherein the memory contains further instructions which when executed by the processing circuitry further configure the system to:
inspect the workload for a cybersecurity risk.

23. The system of claim 14, wherein the memory contains further instructions which when executed by the processing circuitry further configure the system to:
generate a lateral movement simulation in response to indicating that the workload is simulated as compromised.

24. The system of claim 23, wherein the memory contains further instructions which when executed by the processing circuitry further configure the system to:
tag the workload with a compromised simulation indicator.

25. The system of claim 14, wherein the memory contains further instructions which when executed by the processing circuitry further configure the system to:
query the security database to detect a representation of a second resource in the cloud computing environment, wherein the representation of the second resource is associated with a representation of a second private key, and further associated with a representation of a certificate having a wildcard.

* * * * *